United States Patent [19]

Wu

[11] Patent Number: 5,776,631
[45] Date of Patent: Jul. 7, 1998

[54] SAFETY SNAP-THROUGH SEAL FOR GALVANIC CELLS

[75] Inventor: Xi-Xian Wu, North Olmsted, Ohio

[73] Assignee: Eveready Battery Company, Inc., St. Louis, Mo.

[21] Appl. No.: 568,160

[22] Filed: Dec. 6, 1995

[51] Int. Cl.[6] .................................................. H01M 2/02
[52] U.S. Cl. ........................ 429/171; 429/163; 429/172; 429/174; 429/185
[58] Field of Search .................................. 429/163, 171, 429/172, 174, 185

[56] References Cited

U.S. PATENT DOCUMENTS

| 4,670,362 | 6/1987 | Wiacek et al. | 429/163 |
| 5,080,985 | 1/1992 | Wiacek et al. | 429/172 |
| 5,173,379 | 12/1992 | Ichinose et al. | 429/174 |
| 5,422,201 | 6/1995 | Georgopoulos | 429/174 |

*Primary Examiner*—Bruce F. Bell
*Attorney, Agent, or Firm*—Robert W. Welsh; Michael C. Pophal

[57] ABSTRACT

An electrochemical cell containing a vent assembly for sealing the cell and having a snap-through seal membrane in the form of a concave contour that is designed to snap from a concave contour to a convex contour and rupture upon the build-up of a predetermined pressure within the cell.

20 Claims, 1 Drawing Sheet

5,776,631

SAFETY SNAP-THROUGH SEAL FOR GALVANIC CELLS

FIELD OF THE INVENTION

The invention relates to a safety snap-through seal for galvanic cells and more particularly to a predetermined pressure acting vent means for releasing excessive gas pressure from inside the cells.

BACKGROUND OF THE INVENTION

Galvanic cells may generate large quantities of gas under certain conditions during use. Since these cells are required to be tightly sealed at all times in order to prevent loss of electrolyte by leakage, high internal gas pressures may develop. Such pressures may cause leakage, bulging or possible explosion of the cell if not properly vented. If a vent valve is employed, it generally is resealable in order to avoid drying out of the electrolyte over the life of the cell and to prevent ingress of oxygen from the atmosphere which can cause wasteful corrosion of the anode.

In the past several different types of resealable pressure relief vent valves have been used for releasing high internal gas pressures from inside a sealed galvanic cell. One type of valve that has been commonly used consists basically of a valve member, such as a flat rubber gasket, which is biased into a sealing position over a vent orifice by means of a resilient member, such as a helical spring. The resilient member or spring is designed to yield at a certain predetermined internal gas pressure so as to momentarily relieve the seal and allow the gas to escape through the vent orifice.

Another type of resealable vent is disclosed in U.S. Pat. No. 3,451,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momentarily break the seal and allow gas to escape through the vent orifice.

Alternates to high pressure resealable vent means are fail safe venting systems as illustrated in U.S. Pat. Nos. 3,218,197 and 3,314,824. Specifically in the 1197 patent a venting means is disclosed in which the seal gasket has a thin section that will rupture or "blow-out" at a predetermined high pressure buildup within the cell. The difficulty with this type of venting means is that for small diameter cells it is difficult to obtain consistency in the thickness of the "blow-out" section of the gasket using conventional manufacturing techniques. In the 1824 patent a puncture-type safety seal is disclosed which comprises a spring washer positioned within the cell's seal assembly and a radially acting toothed puncture washer. The teeth of the washer slide relative to the spring washer when the spring washer is subjected to internal pressure so that at a predetermined gas pressure buildup, the teeth of the washer will puncture the seal's gasket thereby providing a vent passage. This type of venting means requires several component parts, is rather expensive to make and assemble, and is not suitable for small diameter cells.

U.S. Pat. No. 4,079,172 discloses sealed galvanic dry cells having at least one gas venting passage disposed at the interface of the top surface of the cover and then curled over the rim of the container. The passage is defined as being a recess in the cover disposed below the curled over rim and/or a notch in a portion of the curled over rim.

U.S. Pat. No. 5,227,261 relates to electrochemical cells which are comprised of a seal member that has a centrally located cylindrical hub joining a base, which base has a ventable diaphragm portion and a nonventable diaphragm portion, which hub has an end extending above the base and an end extending below the base, into which a current collector is inserted in an interference fit with the end extending above the base, which ventable diaphragm portion joins the hub at an interface forming an arc of between about 135 degrees and 250 degrees, and which interface is the thinnest portion of the base.

U.S. Pat. No. 4,255,499 relates to a galvanic cell in which a first arc portion between about 150° and 190° of the top peripheral edge of the container is turned or curled over the container's closure means so that when a predetermined high pressure build-up develops in the cell, the pressure will cause the closure means to tip or tilt about the diametral axis formed between the first arc portion and the remaining second arc portion so as to produce a vent passage at the interface of the container and the closure means proximal the remaining second arc portion of the top peripheral edge of the container.

As discussed above, resealable, high pressure relief vent valves are generally bulky and/or difficult to incorporate into a cell assembly, blow-out type safety vents are not suitable for small cell applications, while low pressure vent means for some cell systems may not adequately and sufficiently prevent loss of electrolyte through leakage or prevent ingress of oxygen from the atmosphere which could cause wasteful corrosion of the anode.

It is, therefore, an important object of this invention to provide a compact and economical pressure vent for use in a galvanic cell.

Still another object of this invention is to provide a predetermined pressure vent for galvanic cells which requires a small number of parts and which is, therefore, easy to assemble and inexpensive to manufacture.

Another object of the present invention is to provide a safety vent using a snap-through seal means to vent or release excessive gas pressure from inside of a galvanic cell.

The foregoing and additional objects will become more fully apparent from the following description and the accompanying drawings.

SUMMARY OF THE INVENTION

The invention relates to an electrochemical cell comprising an anode electrode, a cathode electrode and an electrolyte contained in a container, said container having an open end and a closed end and wherein the open end of the container is sealed with a seal assembly comprising a base member having an upstanding peripheral wall and an upstanding hub defining an opening, said base member defined by the peripheral wall and said hub containing at least one membrane having a concave contour facing the inside of the cell; the seal assembly is secured to the open end of the container; a current collector extended through the opening defined by the hub and extended into the container to contact one of the electrodes of the cell; and wherein at least one concave membrane is adapted to snap from its concave contour to an convex contour and rupture upon the application of a predetermined pressure within the cell.

Preferably, a cover having an opening to accommodate the hub is disposed within the peripheral wall and is secured between the peripheral wall and the hub of the seal assembly.

Preferably, the seal assembly in conjunction with the cover (sometimes referred to as a neutral cover) is secured to the container by crimping the rim of the container against the seal assembly and the cover. In this embodiment, the seal assembly which is generally a synthetic material, will act as a barrier to air and moisture and will be strong enough to maintain its sealing after it has been physically abused such as by dropping or exposure to vibration and/or subject to extreme variations in temperature and/or humidity.

The membrane defined as the base membrane could be a single annular concave contoured membrane or two or more concave contoured membranes spaced apart in the base member. If more than one concave contoured membrane is used then, preferably, the concave contoured membranes should be equally spaced apart. If two membranes are used then they should be spaced apart by 180°; if three membranes are used then they should be spaced apart by 120°; if four membranes are used then they should be spaced apart by 90°, etc. The membrane is formed by imparting to the surface of the annular member a concave contour so that at least the outer surface of the membrane will have an arcuate contour. The outer surface of the membrane is defined as the surface that extends the furthest into the container. The opposite surface of the membrane could be flat or parallel to the outer surface or have a contour between these two embodiments.

The snap-through seal has a membrane which is concave facing the inside of a cell. When the internal pressure increases, the membrane flexes slightly and compressive stresses are built up in the membrane and its surrounding structure. The compressive stresses enhance the sealing function of the seal and prevent the seal from developing stress cracks which happen when the seal is under tensile stresses. When the internal pressure reaches the vent pressure, the membrane changes its geometry and becomes convex facing the inside of the cell. The change in the contour of the membrane does not change linearly, but occurs as a pulse of force that changes the geometry from concave to convex and causes the membrane to rupture. This pulse of force will generally take less than 2 seconds to cause the geometry of the membrane to change. When the membrane changes its geometry, the stresses in some region of the membrane become tensile and exceed the material strength, and thus the seal ruptures and releases the internal pressure. The advantages of the snap-through seal over the existing seals with a flat membrane are as follows:

1. The snap-through seal has a better sealing performance because of compression stresses.
2. The snap-through seal usually has a lower vent pressure because of higher stress concentration due to the large geometry change.
3. The snap-through seal can take advantage of the stresses introduced by the mechanical operating, such as closing (reducing can diameter), and environmental changes, such as humidity and temperature changes so that, for example, the vent pressure of the snap-through seal is less sensitive to moisture content and temperature of the seal.

The thickness of the membrane is dependent on the material of the membrane, the size and shape of the concave contour of the membrane, and the internal pressure that can be tolerated before the snap-through seal membrane will rupture. Generally, the thickness of the membrane shall be between 3 and 60 mils, preferably between 6 and 20 mils. For example, for AAAA-size cells, the thickness of the membrane could be between 5 mils to 30 mils and preferably between 8 mils to 20 mils. The preferred internal pressure range for rupturing the snap-through seal membrane for the following cells is as follows:

| Cell Size | Pressure Range (PSI)* | |
|---|---|---|
| | (Minimum) | (Maximum) |
| AAAA | 500 | 4000 |
| AAA | 500 | 3000 |
| AA | 500 | 2500 |
| C | 300 | 1000 |
| D | 100 | 1000 |

*Pounds per square inch

In a preferred embodiment of the seal assembly, the internal peripheral wall has a flange (or it could be a groove) that is aligned with a flange (or it could be a groove) in the external wall defining the hub to accommodate a cover of the cell. This embodiment will maintain the cover in a stable and secure position during the sealing of the cell. Generally, the cover has an opening for releasing the internal pressure exiting through the ruptured membrane and into the atmosphere.

The seal membrane of the seal assembly of this invention can be made of electrically insulative materials that provide a barrier to air and moisture. Examples include any of the engineering moldable plastics such as polyvinyl chloride, polyolefins, nylons, polyesters and the like. A preferred plastic is nylon 6,6 which is available from E. I. DuPont de Demours and Company. The seals could be formed by injection molding the plastics into molds of the desired form. The seals can be used on a variety of electrochemical cell systems. They are primarily intended for use in cells that require sealing from air and moisture and a means for venting pressure build-up.

BRIEF DESCRIPTION OF THE DRAWINGS

The present invention will become more apparent from the following description thereof when considered together with the accompanying drawings which is set forth as being exemplary of the embodiments of the present invention and is not intended in any way to be limitative thereof and wherein:

Referring in detail to FIGS. 1 and 2, there is shown a snap-through seal assembly 1 comprising a base member 2 extending with an upstanding peripheral wall 4 and an upstanding centrally located cylindrical hub 6. Disposed in the base member 2 between the upstanding peripheral wall 4 and hub 6 is a snap-through seal membrane 8 having a concave contour surface 10 parallel to an opposite surface 12. This embodiment of the seal assembly shows the membrane in the form of an annulus so that, effectively, the base member 2 comprises substantially the whole seal membrane 8. If desired, the surface 12 could be flat or any other contour shape as long as the membrane seal will rupture within a redetermined range. As shown in FIGS. 1 and 2, peripheral wall 4 is designed with a flange 14 that is aligned with a flange 16 designed in hub 6 to accommodate a cover which will discussed as shown in FIG. 5.

The concave contour of membrane 8 could be formed with a plurality of flat segments to approximate a radial arc or arcuate contour.

Figure 1:
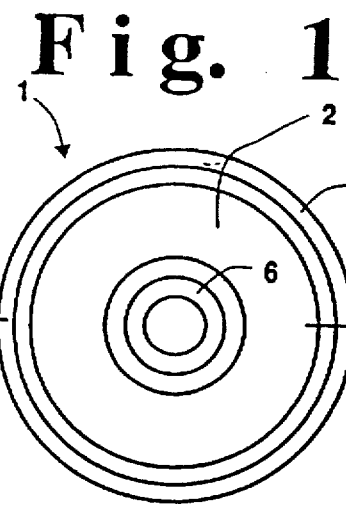
FIG. 1 is a top view of a snap-through seal for use in this invention.
Figure 2:
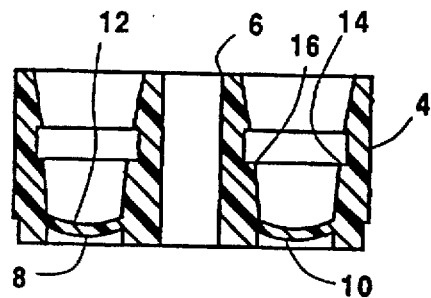
FIG. 2 is a sectional elevation taken through line 2—2 of the snap-through seal of FIG. 1.
Figure 3:
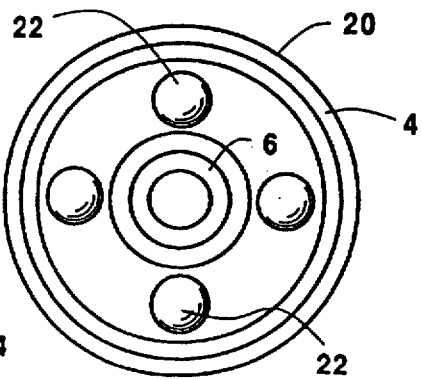
FIG. 3 is a top view of a different embodiment of a snap-through seal of this invention.
Figure 4:
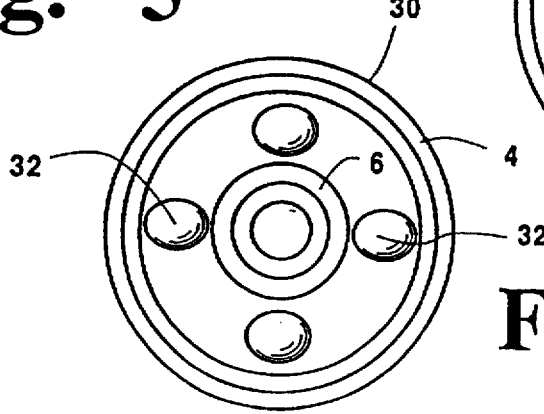
FIG. 4 is a top view of a different embodiment of a snap-through seal of this invention.

FIG. 3 shows another embodiment of a seal assembly 20 similar to FIG. 1 and having identical parts identified with the same reference numbers except that the base member contains four equally spaced apart seal membranes 22 in the form of circular concave elements. Another embodiment of a seal assembly 30 is shown in FIG. 4 in which the seal membranes 30 are in the form of oval shaped concave elements 32. In the embodiments of this invention, the seal membrane is designed to immediately change its geometry and rupture upon the build-up of a predetermined range of internal pressure within a selected size of cell.

Figure 5:
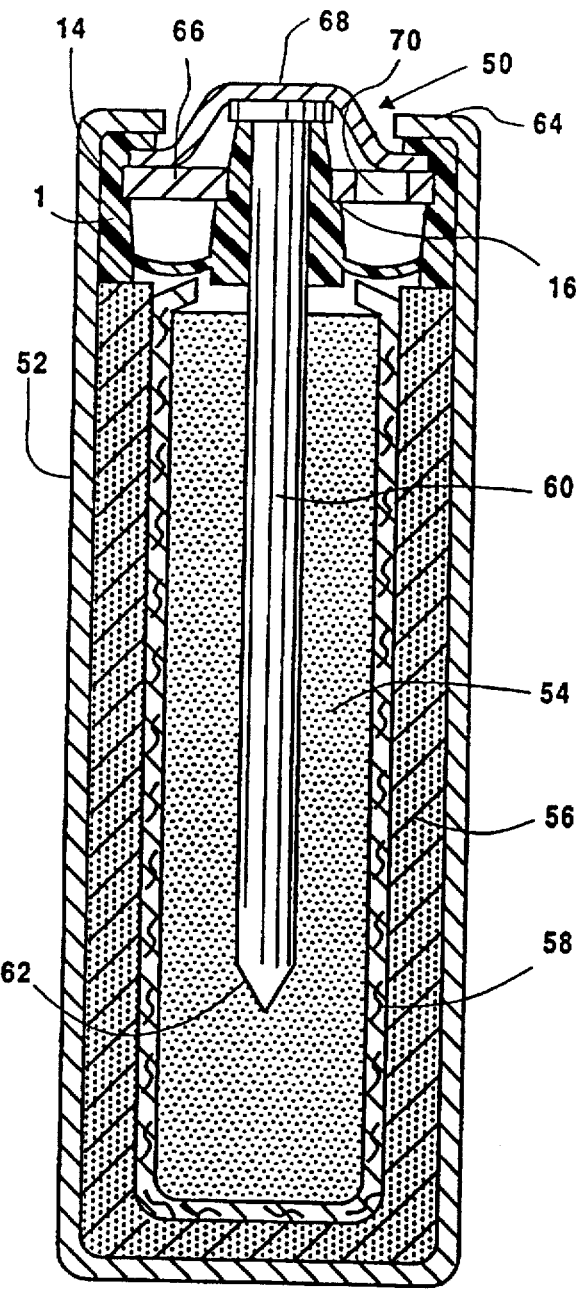
FIG. 5 is a sectional elevation of the closure means of FIG. 1 shown assembled in a galvanic raw cell.

FIG. 5 shows an assembled alkaline manganese dioxide-zinc raw cell 50 comprising container 52 having disposed therein an anode mix 54 and cathode 56 separated by a separator 58. The anode mix 54 could comprise particulated zinc with a gelling agent and an electrolyte, such as aqueous potassium hydroxide. The cathode could comprise manganese dioxide and a conductive material, such as graphite. As shown in FIG. 5 the closure means 1 of FIG. 1 is positioned within the open end of the container where the seal assembly 1 rests on the cathode 56. If desired, a layer of sealant may be disposed at the interface of the seal and the container. Upon inserting seal assembly 1 in container 52, current collector rod 60 having a tapered end 62 is forced into anode mix 54 to make good contact therewith. Once the closure means 1 is seated within container 52 and cover 66 is seated within seal assembly 1 and a terminal cover 68 disposed over the current collector rod 60, the annular edge segment 64 of container 52 is radially compressed against the seal cover 66, cover 68, rod 60 members thereby radially sealing the seal assembly 1 to the opening of the container 52.

The cover 66 is designed to seat within seal assembly 1 on flange 14 of peripheral wall 4 and flange 16 of hub 6 of seal assembly 1. An opening 70 is disposed in cover 66 to permit the internal pressure to vent to the atmosphere upon rupture of the membrane.

It is to be understood that other modifications and changes to the preferred embodiment of the invention herein shown and described can also be made without departing from the spirit and scope of the invention.

What is claimed:

1. An electrochemical cell comprising an anode electrode, a cathode electrode and an electrolyte contained in a container, said container having an open end and a closed end and wherein the open end of the container is sealed with a seal assembly comprising a base member having an upstanding peripheral wall and an upstanding hub defining an opening, said base member defined by the peripheral wall and said hub containing at least one membrane having a concave contour facing the inside of the cell; the seal assembly is secured to the open end of the container; a current collector rod extended through the opening defined by the hub and extended into the container to contact one of the electrodes of the cell; and wherein the at least one concave membrane which snaps from its concave contour to a convex contour and rupture upon the application of a set pressure within the cell.

2. The electrochemical cell of claim 1 wherein a cover having an opening to accommodate the hub and disposed within the peripheral wall and, is secured between the peripheral wall and the hub of the seal assembly.

3. The electrochemical cell of claim 2 wherein the peripheral wall comprises an inner wall having a flange, the hub comprises an outer wall having a flange and said flange in the peripherial wall is aligned with the flange in the hub and the cover is seated on the flanges.

4. The electrochemical cell of claim 3 wherein the membrane defined in the base member comprises a single annulus shaped membrane having a concave contour.

5. The electrochemical cell of claim 3 wherein the membrane defined in the base member comprises at least two spaced apart membrane elements.

6. The electrochemical cell of claim 5 wherein the membrane elements are equally spaced apart.

7. The electrochemical cell of claim 5 wherein the membrane elements are circularly shaped concave seal membrane elements.

8. The electrochemical cell of claim 2 wherein the membrane defined in the base member comprises a single annulus shaped membrane having a concave contour.

9. The electrochemical cell of claim 2 wherein the anode is comprised of zinc, the cathode is comprised of manganese dioxide, and the electrolyte is potassium hydroxide.

10. The electrochemical cell of claim 1 wherein the membrane defined in the base member comprises a single annulus shaped membrane having a concave contour.

11. The electrochemical cell of claim 1 wherein the membrane defined in the base member comprises at least two spaced apart membrane elements.

12. The electrochemical cell of claim 11 wherein the membrane elements are equally spaced apart.

13. The electrochemical cell of claim 11 wherein the membrane elements are circularly shaped concave seal membrane elements.

14. The electrochemical cell of claim 11 wherein the membrane elements are oval shaped concave seal membrane elements.

15. The electrochemical cell of claim 1 wherein the thickness of the membrane is between 3 mils and 60 mils.

16. The electrochemical cell of claim 15 wherein the membrane defined in the base member comprises a single annulus shaped membrane having a concave contour comprised of a plurality of flat segments.

17. The electrochemical cell of claim 1 wherein the membrane is defined by opposite surfaces and only the contour of one surface is concave.

18. The electrochemical cell of claim 1 wherein the membrane is defined by opposite surfaces and both surfaces are concave.

19. The electrochemical cell of claim 18 wherein the membrane defined in the base member comprises a single annulus shaped membrane having a concave contour.

20. The electrochemical cell of claim 1 wherein the anode is comprised of zinc, the cathode is comprised of manganese dioxide, and the electrolyte is potassium hydroxide.

* * * * *